No. 892,756.

PATENTED JULY 7, 1908.

W. E. MORRIS.
RAT TRAP.
APPLICATION FILED MAR. 24, 1908.

Witnesses:
A. A. Olson
P. J. McAllister

Inventor:
William E. Morris
by Joshua R. H. Potts
Atty.

UNITED STATES PATENT OFFICE.

WILLIAM E. MORRIS, OF CHICAGO, ILLINOIS.

RAT-TRAP.

No. 892,756.  Specification of Letters Patent.  Patented July 7, 1908.

Application filed March 24, 1908. Serial No. 422,988.

*To all whom it may concern:*

Be it known that I, WILLIAM E. MORRIS, a citizen of the United States, residing at Chicago, county of Cook, and State of Illinois, have invented certain new and useful Improvements in Rat-Traps, of which the following is a specification.

My invention relates to animal traps and particularly to rat traps; and the object of my invention is to provide a rat trap which may be arranged to bring the entrance thereof to the entrance of a rat hole, wherever it may be whether in a corner, sidewall or floor, so that the rats cannot leave the hole without entering the trap.

Other objects will appear hereinafter.

With these objects in view, my invention consists generally in a box like body having a trap door partition dividing it into an entrance and trap chambers, a pair of doors closing the entrance end of the box, the bottom at the entrance end having an aperture or hole, and a slide on the top of the door and adapted to be extended beyond the end of the box to close the space between the upper edges of the doors when partially open.

My invention further consists in various details of construction and arrangements of parts all as will be hereinafter fully described, and particularly pointed out in the claims.

Figure 1:
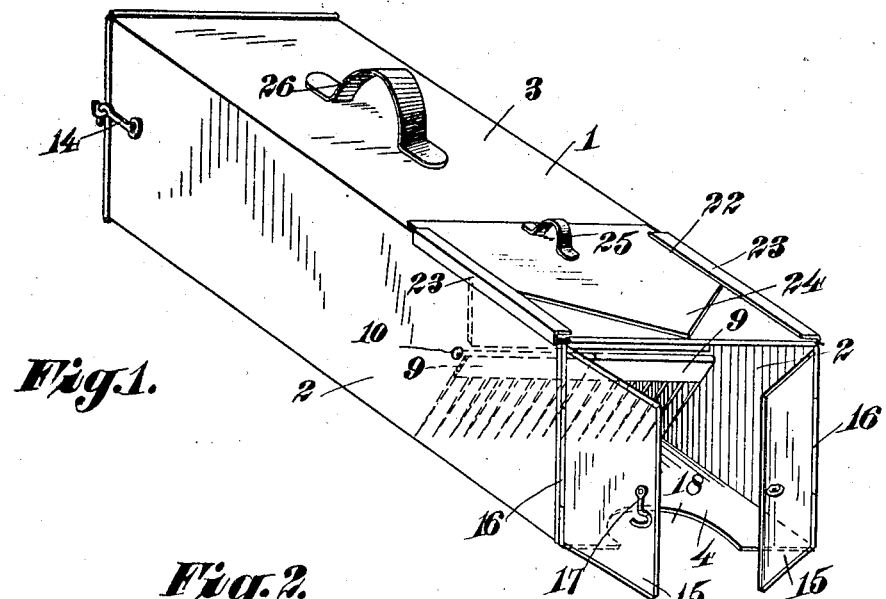
Figure 2:
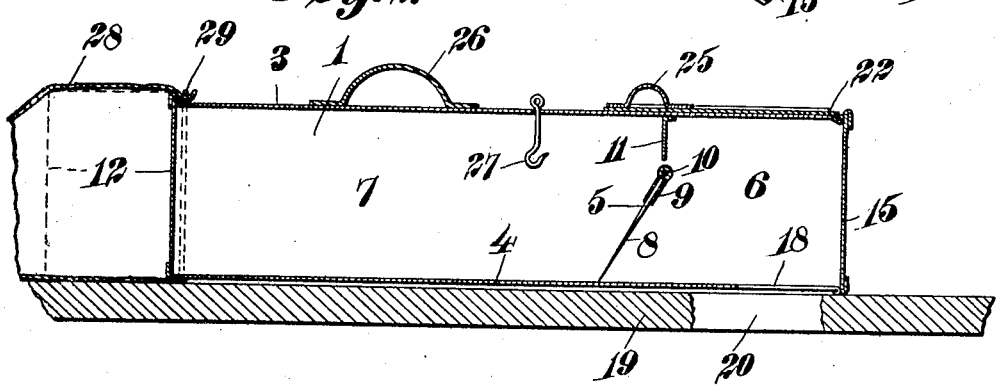
Figure 3:
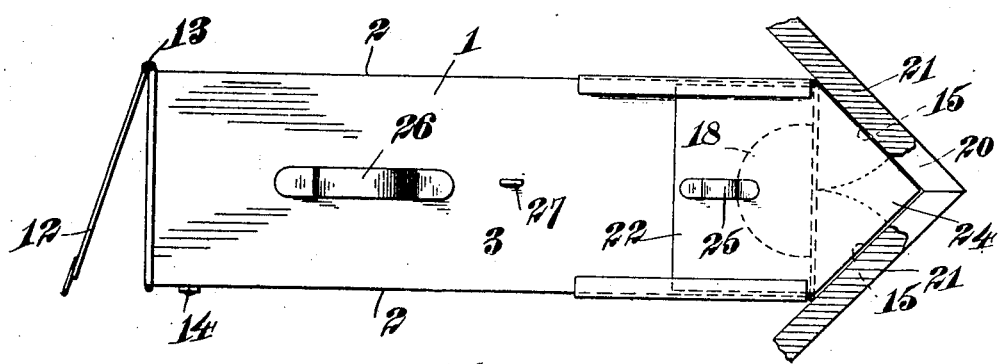

My invention will be more readily understood by reference to the accompanying drawings forming a part of this specification, and in which, Figure 1 is a perspective view of the trap with the end doors partially opened, Fig. 2 is a vertical longitudinal section illustrating the device arranged in position at the entrance to a hole in a floor, and Fig. 3 is a top plan view illustrating the device as arranged at a hole in a corner.

Referring to the drawings, 1 indicates the body of the trap which comprises a rectangular box like member consisting of the side walls 2—2 and the top and bottom walls 3 and 4 respectively. The body 1 is preferably elongated and is divided near one end by trap doors 5 into entrance and trap chambers 6 and 7 respectively. The doors 5 consist of a plurality of parallel sharpened prongs rigidly connected at their upper ends by the plates 9 and hingedly mounted upon a transverse bar or rod 10 arranged beneath a transverse flange 11 depending from the top 3. The rear end of the chamber 7 is closed by a door 12 hingedly connected to one side as at 13 and secured in closed position by a hook 14 or other suitable locking means. The front or entrance end is closed by a pair of doors 15—15 hingedly connected as at 16 to the sides of the box and secured in closed position by a hook or equivalent device 17. The bottom 4 at its front edge is provided with an opening or aperture 18 which forms the entrance to the box when the doors 15 are closed. This is employed when a rat hole is in the floor, the hole 18 being placed above the hole in the floor as shown in Fig. 2, 19 indicating the floor and 20 the rat hole.

If the rat hole is in a side wall the doors 15 are thrown back or wide open and the end of the box is placed to close the hole. Frequently the rat hole is in a corner as indicated in Fig. 3, in this case the doors are thrown partially open and at an angle corresponding to the walls 21, that is each door is placed at about 45 degrees. To close the space between the upper edges of the doors when the trap is in this position, I provide a slide 22 mounted in guides 23 upon the top of the box. The end of the slide is pointed as at 24 to conform to the walls 21 and is extended beyond the end of the box as shown in Fig. 3. 25 indicates a handle on the slide for manipulating the same and 26 a handle on the top of the box for lifting or handling the trap.

27 is a bait hook arranged in the chamber 7.

When catching rats in large numbers a sack or bag formed of stout netting may be secured to the rear end of the box, the door 12 being opened. In Fig. 2 I have illustrated this arrangement, 28 indicating the sack and 29 a band or strap for securing it in position.

Having described my invention what I claim as new and desire to secure by Letters Patent, is:

1. A rat trap comprising a box like body having a trap door partition extending transversely thereof, the bottom of said body near one end having an entrance hole, a pair of doors hingedly mounted at the entrance end of the trap and a slide upon the top of the body and adapted to be extended beyond the end of the box to close the space above the doors when partially open, substantially as described.

2. A rat trap comprising an elongated rectangular box like body divided by a transverse trap door, a door closing one end of said body and a pair of doors hingedly connected to said body at the opposite end, the bottom of said body being provided with an opening adjacent to said doors and a slide on the top of said body adapted to close the space between the upper edges of the doors when partially open, said slide having a pointed end, substantially as described.

In testimony whereof I have signed my name to this specification in the presence of two subscribing witnesses.

WILLIAM E. MORRIS.

Witnesses:
HELEN F. LILLIS,
ANNA L. EKVALL.